UNITED STATES PATENT OFFICE.

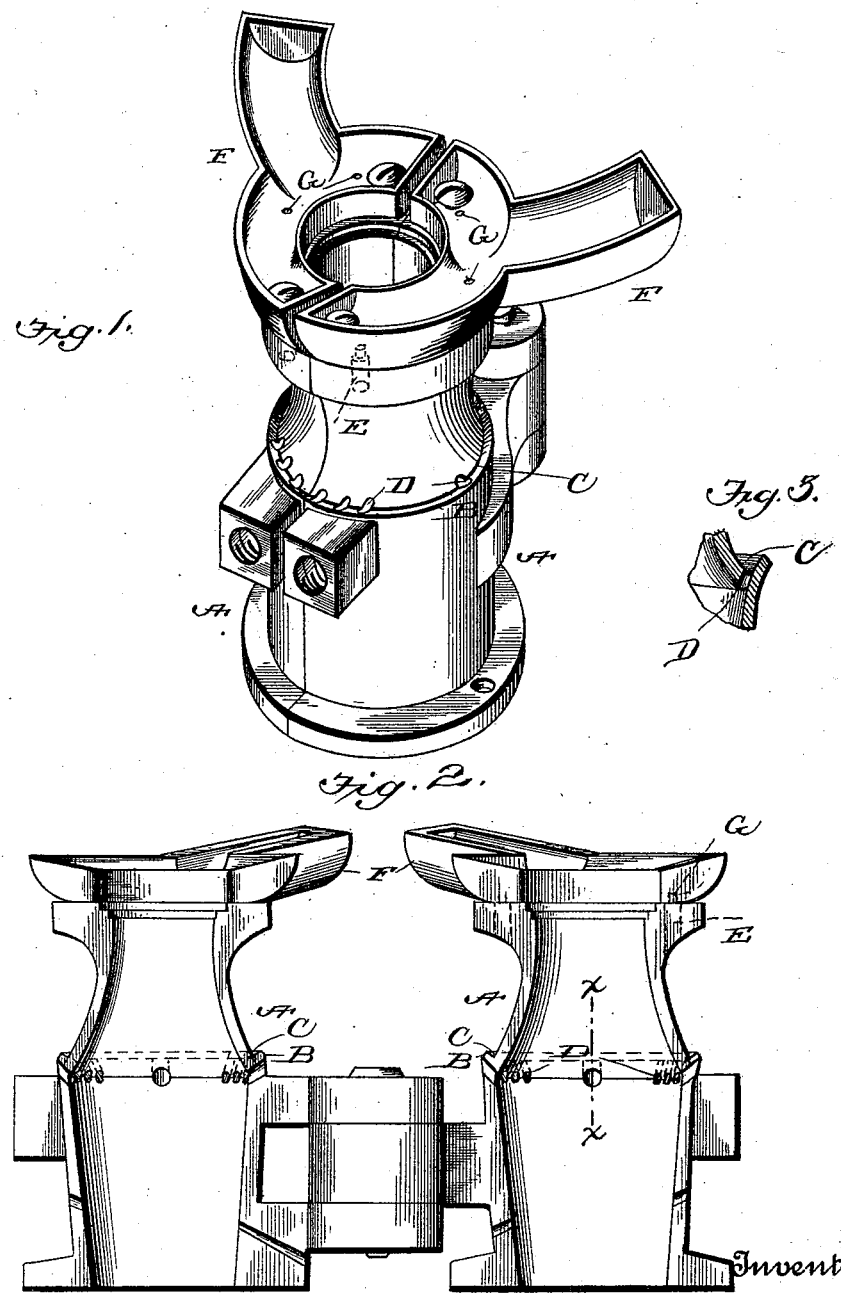

PETER M. MOMPER AND OTTO SIGWART, OF FOSTORIA, OHIO, ASSIGNORS TO THE SENECA GLASS COMPANY, OF SAME PLACE.

GLASS-MOLD.

SPECIFICATION forming part of Letters Patent No. 527,801, dated October 23, 1894.

Application filed June 20, 1894. Serial No. 515,173. (No model.)

*To all whom it may concern:*

Be it known that we, PETER M. MOMPER and OTTO SIGWART, citizens of the United States, residing at Fostoria, in the county of Seneca and State of Ohio, have invented certain new and useful Improvements in Glass-Molds; and we do declare the following to be a full, clear, and exact description of the invention, such as will enable others skilled in the art to which it appertains to make and use the same, reference being had to the accompanying drawings, and to the letters of reference marked thereon, which form a part of this specification.

Our invention relates to that class of molds which are used in making glass bottles, tumblers, table ware, &c., and in which a paste is employed to prevent the molten glass from adhering to the mold and the particular object of our invention is to overcome the loss of time and labor which is now occasioned by dipping the mold in water to dampen and cool the paste in order to prevent burning of the same.

With this object in view, our invention consists in so constructing the mold that a small stream or body of water may run down the side of the same and pass onto and over the paste without interfering with the use of the mold as will be hereinafter fully described and pointed out.

In the accompanying drawings, which fully illustrate our invention, Figure 1 is a perspective view. Fig. 2 is a vertical section of a mold constructed in accordance with our invention, and Fig. 3 is a detail section on the line x—x of Fig. 2.

The mold is composed of two members A A hinged together as is usual and of any convenient or preferred size or shape. The mold is constructed with an annular shoulder or rim B and in this rim or shoulder we form the trough C as clearly shown. A series of perforations or openings D lead downward from this trough through the wall of the mold and into the interior of the same. The upper end of the mold is provided with a similar series of perforations or openings E and to and upon the said upper end of the mold we secure the cup-like arms F which are provided with perforations G in their bottoms registering with the openings E in the upper end of the mold. These arms are shown as made separate from the mold and secured to the same but they may be made integral with the mold as will be readily understood. It will be readily understood, of course, that the mold is provided with the usual vents H.

In practice, the mold is lined with a paste up to the plane of the annular rim or shoulder B to prevent the molten glass from adhering to the mold. The glass which passes above that line is generally broken off and needs no protection. This paste will burn under contact with the hot glass unless it is kept damp or wet and to prevent such burning it is now usual to dip the mold in a tank of water after each operation. This operation is laborious and consumes much time.

In using our improved mold a fine stream of water is fed into the cup-like arms F from which it passes downward through the perforations and over the wall of the mold to the annular rim or shoulder where it is caught by the trough in said shoulder or rim. From this trough, the water passes through the perforations into the interior of the mold where it runs onto the paste and accomplishes the desired result. Should there be an excess of water in the trough it will run over the rim and thence down over the wall of the mold, cooling the same, as will be readily understood.

The perforations or openings in the trough and the rim are very small so as to prevent a flushing of the mold and consequent washing away of the paste, and the water is supplied to the paste at the proper point and in the proper quantity to effect the best results.

The advantages of the invention are thought to be obvious from the foregoing description and further detailed reference thereto is deemed unnecessary.

Having thus described our invention, what we claim, and desire to secure by Letters Patent, is—

1. A glass mold provided with an annular shoulder or rim and having a trough in said shoulder and perforations leading from said trough through the wall of the mold.

2. A glass mold provided with an annular shoulder or rim and having perforations leading from said shoulder into the interior of the mold and provided with cup-like arms at its upper end provided with perforations in their bottoms.

3. A glass mold provided with an annular shoulder or rim and having a trough in said shoulder and perforations leading from said trough through the wall of the mold, and provided at its upper end with cup-like arms having perforations in their bottoms.

In testimony whereof we affix our signatures in presence of two witnesses.

PETER M. MOMPER.
OTTO SIGWART.

Witnesses:
SHERMAN C. HOLADAY,
JOHN A. BRADNER.